(12) United States Patent
Kulesha

(10) Patent No.: US 7,841,421 B2
(45) Date of Patent: Nov. 30, 2010

(54) BALLISTIC FIRE PROTECTION SYSTEM

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 11/759,798

(22) Filed: Jun. 7, 2007

(65) Prior Publication Data

US 2008/0302545 A1    Dec. 11, 2008

(51) Int. Cl.
*A62C 3/06* (2006.01)
*A62C 3/00* (2006.01)
*F16B 21/00* (2006.01)

(52) U.S. Cl. .............. 169/66; 169/46; 169/62; 169/45; 411/339; 411/546

(58) Field of Classification Search .......... 169/45, 169/57, 58, 62, 66, 54; 244/132; 411/378, 411/34, 82.5, 82.1, 82.3, 107, 352, 353, 533, 411/546, 999, 339; 24/572.1; 428/116, 117, 428/118
See application file for complete search history.

(56) References Cited

U.S. PATENT DOCUMENTS

| | | | | |
|---|---|---|---|---|
| 2,917,116 A | * | 12/1959 | Wyant | 169/57 |
| 4,121,666 A | * | 10/1978 | Rozniecki | 169/62 |
| 4,132,271 A | * | 1/1979 | Mikaila | 169/62 |
| 4,251,579 A | * | 2/1981 | Lee et al. | 428/73 |
| 4,356,869 A | * | 11/1982 | Buttrey | 169/49 |
| 4,717,612 A | * | 1/1988 | Shackelford | 428/116 |
| 5,762,145 A | * | 6/1998 | Bennett | 169/62 |
| 6,264,412 B1 | * | 7/2001 | Nakamura et al. | 411/352 |
| 6,572,948 B1 | * | 6/2003 | Dykhoff | 428/76 |
| 6,915,861 B2 | * | 7/2005 | Goodworth et al. | 169/66 |
| 6,948,567 B1 | * | 9/2005 | Cyphers et al. | 169/58 |
| 7,050,286 B2 | * | 5/2006 | Pridham et al. | 361/218 |
| 7,284,726 B2 | * | 10/2007 | Fabian et al. | 244/17.11 |
| 7,341,113 B2 | * | 3/2008 | Fallis et al. | 169/46 |
| 7,422,178 B2 | * | 9/2008 | DeLaune | 244/132 |
| 7,478,579 B2 | * | 1/2009 | Carberry et al. | 89/36.02 |
| 2006/0243860 A1 | * | 11/2006 | Kismarton | 244/132 |

* cited by examiner

*Primary Examiner*—Dinh Q Nguyen
*Assistant Examiner*—Justin Jonaitis
(74) *Attorney, Agent, or Firm*—Weiss & Moy, P.C.

(57) ABSTRACT

A fire protection device has a panel having a plurality of channels formed there through. A plurality of containers is used for holding a fire suppression material. Each container is placed in one of the plurality of channels. An attachment device is used for removably coupling the fire protection device to a structure to be protected.

18 Claims, 4 Drawing Sheets

BALLISTIC FIRE PROTECTION SYSTEM

BACKGROUND

Embodiments of this disclosure relate generally to fire protection systems, and more particularly, to a ballistic power panel that reduces fire in and around the fuel cell after a ballistic penetration of the fuel cell.

Aircraft that may be subjected to enemy gun fire generally have a fire suppression system to suppress fires in the areas surrounding the fuel cells after impact of the fuel cell from a ballistic round. There are currently three different passive approaches to reduce fire in and around a fuel cell after a ballistic penetration from an armor piercing round. They are: ballistic foam, aluminum oxide powder filled bags on the outside of the fuel cell, and aluminum oxide honeycomb powder filled panels.

When using ballistic foam, the ballistic foam has to be cut to fit the specific height of each individual frame of the fuel cell. The ballistic foam is then bonded into place. This practice requires many hand fitted foam blocks to be cut and bonded onto the structure and themselves. An additional ply of epoxy glass fabric is cured onto the interface surface of the foam blocks and the fuel tank assembly after all of the foam blocks has been installed and bonded. The ballistic foam is heavy and the installation is a time consuming and costly process. Furthermore, once the foam blocks have been bonded to the structure, it is difficult to have easy access to the structure in the advent of damage or inspection. This method also requires a separate ballistic liner to be manufactured and installed prior to the installation of the fuel tank further increasing the time, cost, and complexity for this process.

The other two approaches to reduce fire around a fuel cell after a ballistic penetration use aluminum oxide powder. In one approach, aluminum oxide filled bags are placed on the outside of the fuel cell. The use of aluminum oxide powder filled bags is heavy. Furthermore, an adhesive needs to be applied over the entire surface of the bags which further increases the weight and time for installation. It is also difficult to install the bags since there is a potential for the bags to tear.

The third approach is the use of a honeycomb panel filled with ballistic powder. This approach requires the individual cells to be filled with the aluminum oxide. There is a difficulty in filling the honeycomb cells to the appropriate level when the panel is flat, but it is even more difficult to fill the honeycomb cells with aluminum oxide powder when the panels are curved. The honeycomb panels are difficult to manufacture since the honeycomb cells have a tendency to either crush or deform when curved panels are manufactured. Also, during the curing process, resin may flow into the honeycomb cells partially blocking the honeycomb cells. The honeycomb panels have a single ply of fabric having a thin adhesive layer covering the honeycomb core cells. The removal of the face sheet off of the core sometimes damages the panel thus making installation difficult.

Therefore, it would be desirable to provide an apparatus that overcomes the above problems. The apparatus would overcome the cost, weight, accessibility and other issues associated with other prior art passive approaches to reduce fire in and around a fuel cell after a ballistic penetration.

SUMMARY

A fire protection device has a panel having a plurality of channels formed there through. A plurality of containers is used for holding a fire suppression material. Each container is placed in one of the plurality of channels. An attachment device is used for removably coupling the fire protection device to a structure to be protected.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figures 1, 2:
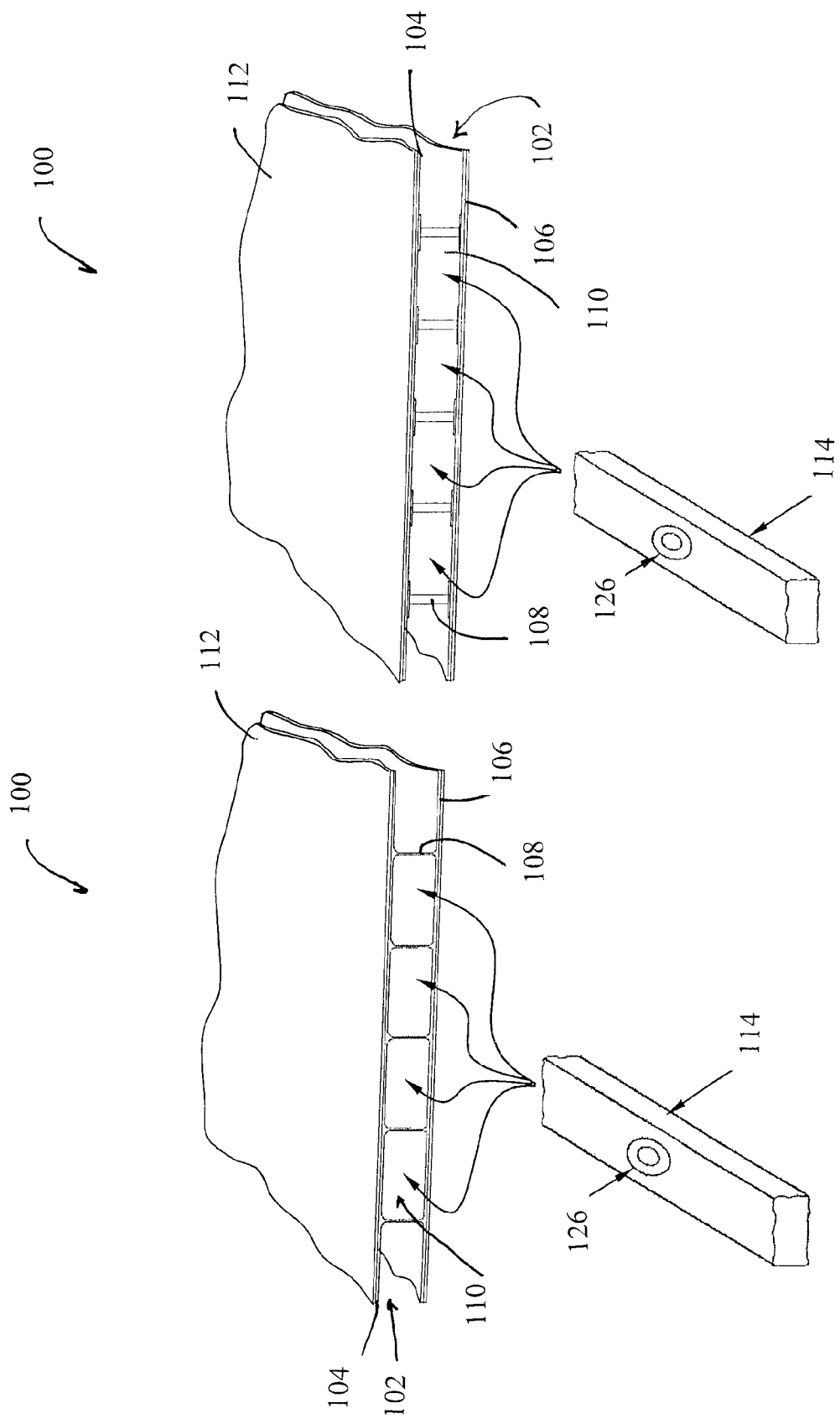
FIG. 1 is a perspective view of one embodiment of the ballistic fire protection panel.
FIG. 2 is a perspective view of another embodiment of the ballistic fire protection panel.

With reference now to FIGS. 1 and 2, a perspective sectional view of a fire protection system 100 is shown. The fire protection system 100 will minimize the chance of a fuel fire after penetration of a fuel cell by a ballistic round or the like. The fire protection system 100 lowers the cost and weight of prior art passive devices, and improves on the accessibility of components and dispersion of the aluminum oxide powder or other flame retardant powder of the prior art passive devices.

The fire protection system 100 uses a panel 102. The panel 102 has a first sheet 104 and a second sheet 106. A plurality of beams 108 are coupled to the first sheet 104 and the second sheet 106. The first sheet 104 and a second sheet 106 may be bonded to the plurality of beams 108 or attached by other methods. The plurality of beams 108 generally runs a length of the panel 102. This forms a plurality of channels 110 between the first sheet 104 and the second sheet 106 of the panel 102. The first sheet 104 and a second sheet 106 are coupled to the plurality of beams 108 so that the pathway through each channel 110 is unobstructed. The panel 102 may be constructed either utilizing a box beam approach as shown in FIG. 1. Alternatively, the panel 102 may be constructed using separate stand-offs as shown in FIG. 2. The panels 102 may be manufactured in sizes that facilitate optimum manufacturing and installation and structural requirements for different and specific configurations.

The sheets 104 and 106 are made out of a material and have a thickness sufficient to carry the bending and shear loads of the induced fuel cell loads. The beams 108 are also sufficiently thick to carry compression and bending loads due to the size of the fuel cell and the distance between beams 108. The panel 102 is generally made out of a composite material. For example, the material may be fiber reinforced thermoset or thermoplastic. The above is given as examples. Other materials may be used without departing from the spirit and scope.

On one of the sheets 104 or 106 is an integrated backer board 112. The integrated backer board 112 is generally a nylon laminate or like material which is bonded or cured to one of the sheets 104 or 106. The integrated backer board 112 is placed on the sheet 104 or 106 that will be directly attached to the fuel cell. The integrated backer board 112 will take the place of the ballistic backer board used in the prior art. The integrated backer board 112 is used to prevent fuel leakage by assist the self-sealing function of fuel cells. By integrating the backer board 112 to one of the sheets 104 or 106, the number of parts for assembling the fire protection system 100 is reduced, as well as the assembly time and cost.

Aluminum oxide or other flame retardant powder (hereinafter aluminum oxide) is placed in a long light weight container 114. The container 114 needs to prevent moisture from entering the container 114 as this may cause the aluminum oxide to clump together thereby preventing proper dispersal of the aluminum oxide. The container 114 further needs to allow the aluminum oxide to disperse if the container 114 is penetrated by a ballistic round. The container 114 is generally a sealed container such as a plastic bag or the like. The use of the container 114 allows for changing the aluminum oxide powder filled containers 114 to containers 114 filled with different fire retarding materials without changing the panel 102 further reducing costs and enhancing performance.

Once a container 114 is filled with aluminum oxide, the container 114 is placed between consecutive beams 108 in a channel 110. In general, all of the channels 110 of the panel 102 are filled with a filled container 114.

Figure 3:
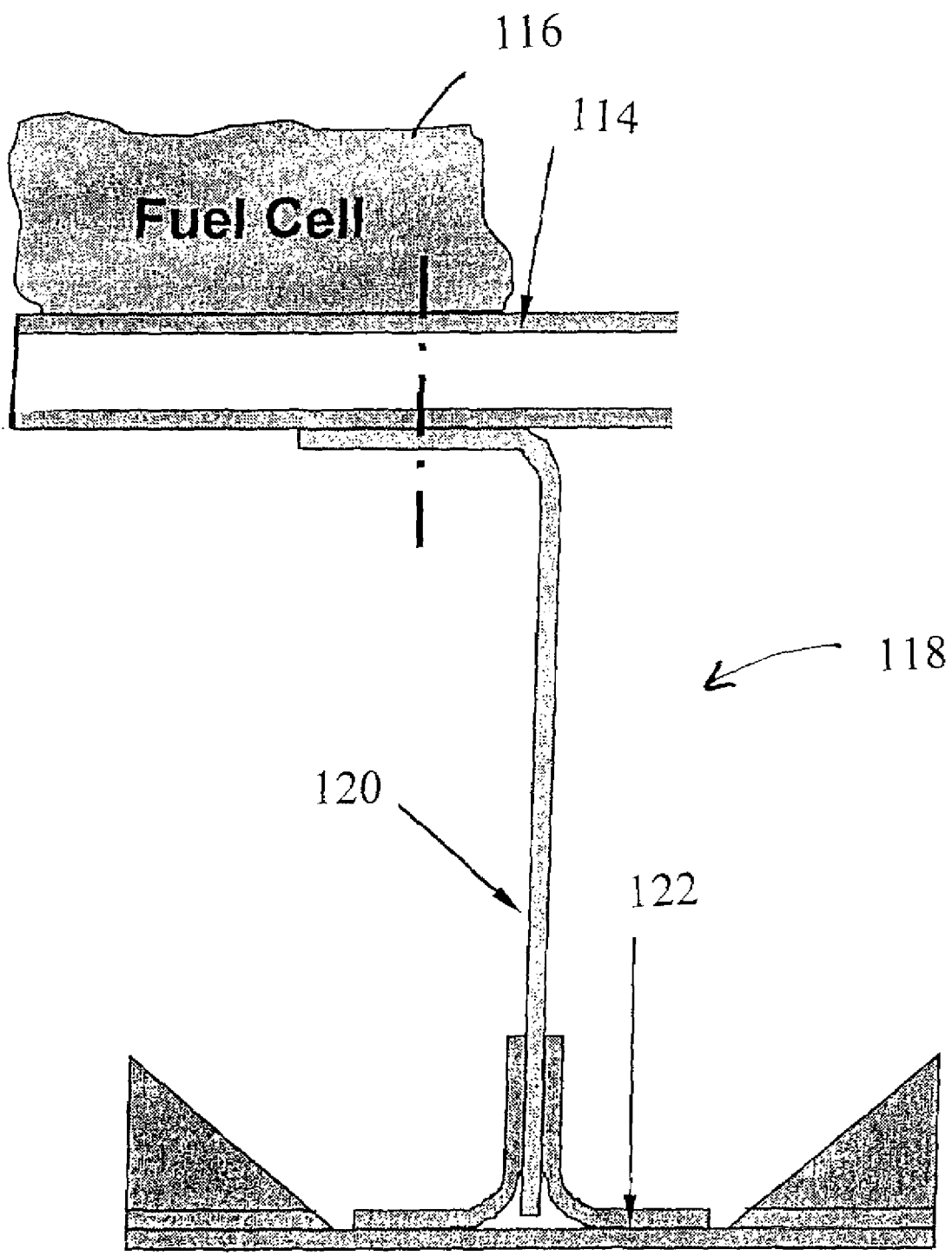
FIG. 3 is a sectional view of the fire protection panel showing one embodiment of a fastening device used to secure the ballistic fire protection panel in position with the powder container removed.

Referring to FIG. 3, the panel 102 is attached to the fuel cell 116 or other structure where fire suppression may be needed. In accordance with one embodiment, fasteners 118 are used to attach the panel 102 to the fuel cell 116. The fasteners 118 will allow for the easy removal of the panel 102 for inspection, repair or replacement.

In accordance with one embodiment, the fastener 118 has a support member 120. One end of the support member 120 is removably attached to the panel 102. The second end of the support member 120 is attached to a support frame 122. The support frame 122 may be part of the aircraft frame, a separate support structure, or the like.

Figure 4:
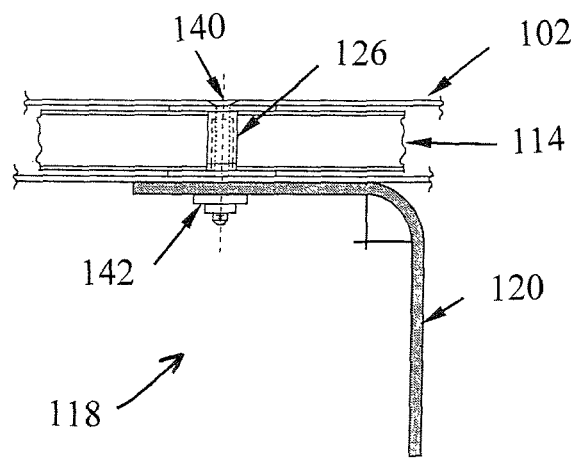
FIG. 4 is a magnified sectional view of the fire protection panel further detailing the fastening device depicted in FIG. 3 with the powder container inserted.
Figure 5:
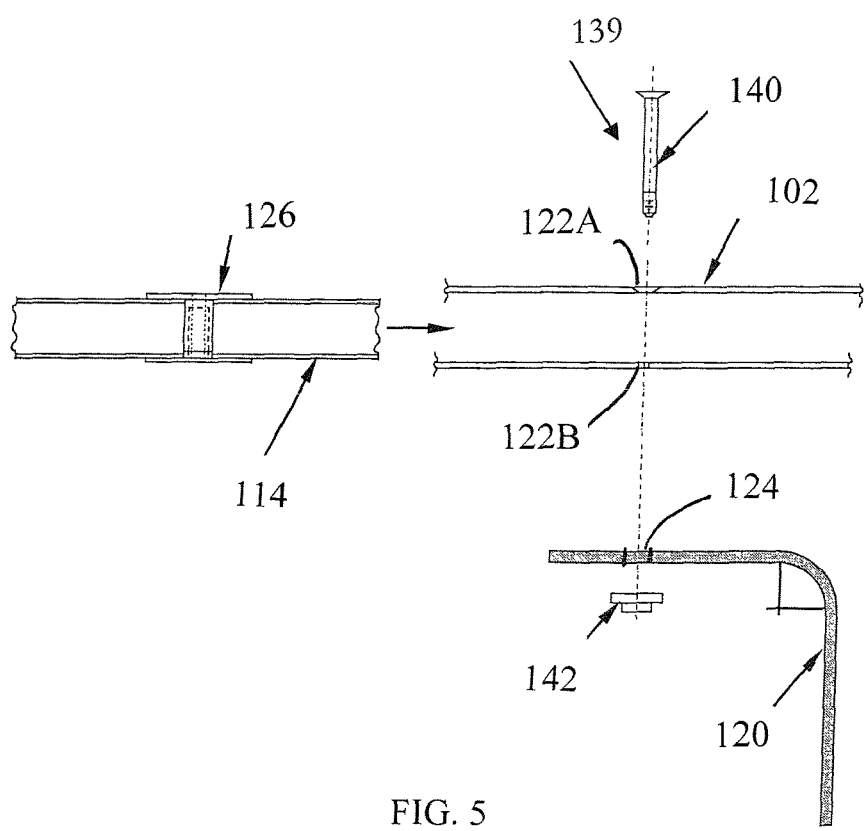
FIG. 5 is an exploded view of the fastening device depicted in FIG. 3.
Figure 6:
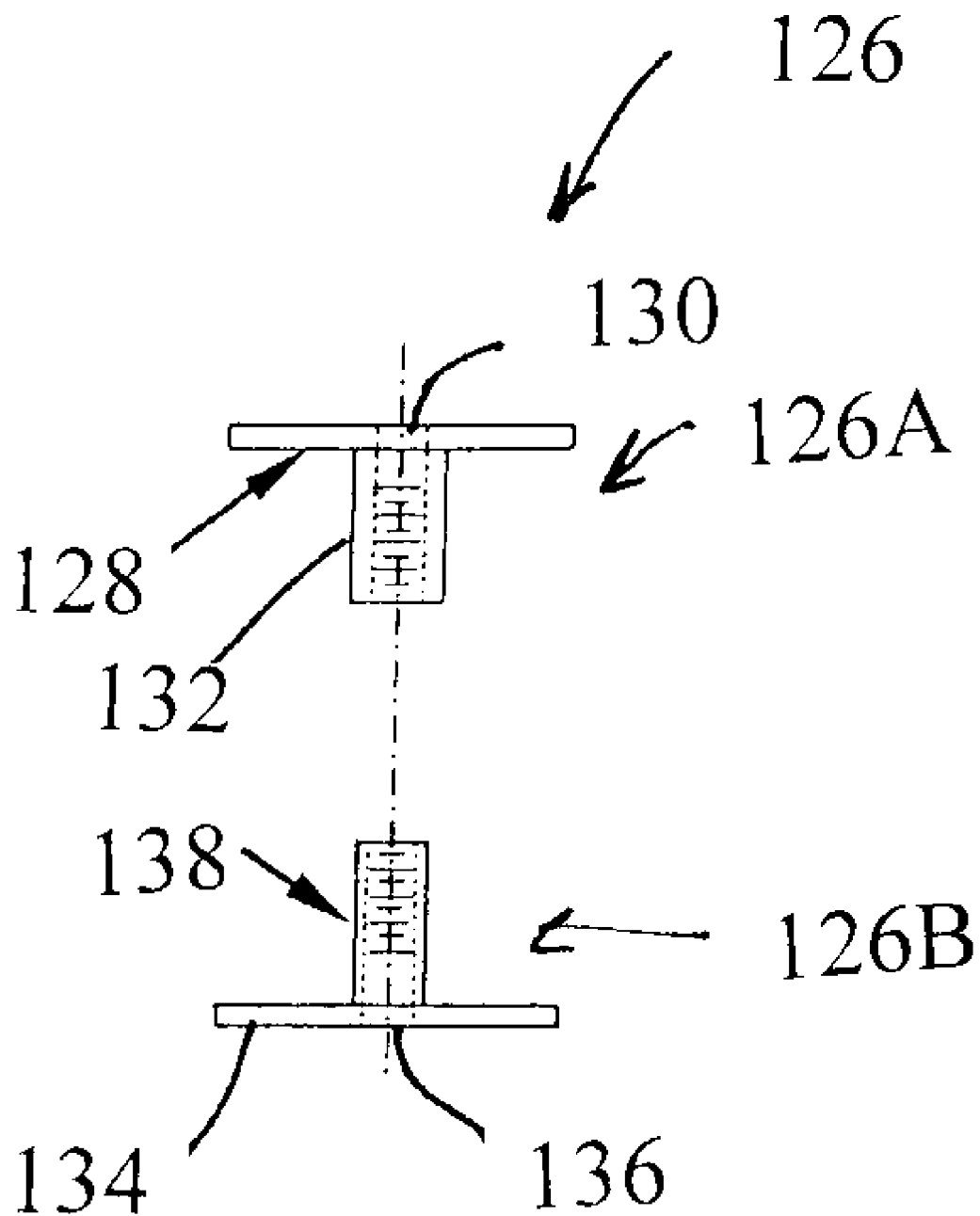
FIG. 6 is a side view of one embodiment of an insert used in the fastening device depicted in FIG. 3.

Referring now to FIGS. 4-6, as stated above, one end of the support member 120 is removably attached to the panel 102. In accordance with one embodiment, an opening 122A is formed in the sheet 104. A corresponding opening 122B is formed in the sheet 106. The openings 122A and 122B will generally be in axial alignment with one another. The number of openings 122A formed in the sheet 104 and corresponding openings 122B are based on the size of the panel 102 and the stability need to attach the panel 102 to the fuel cell 116. Openings 122A and corresponding openings 122B may be formed in every channel 110, every other channel 110, or other combinations thereof.

An opening 124 is formed in the end of the support member 120 that is removably attached to the panel 102. When coupling the support member 120 to the panel 102, the opening 124 will be axial aligned with the opening 122B and hence opening 122A.

An insert 126 is placed in one or more desired containers 114. The insert 126 will form a passage through the desired container 114. The insert 126 is generally sealed to the container 114. Sealing the insert 126 to the container 114 will prevent moisture from entering the container 114 as this may cause the aluminum oxide to clump together thereby preventing proper dispersal of the aluminum oxide.

In accordance with one embodiment, the insert 126 has a first member 126A and a second member 126B. The first member 126A has a head 128 having an opening 130. A hollow tube 132 extends down from the opening 130. In a like manner, the second member 126B has a head 134 having an opening 136. A hollow tube 138 extends down from the opening 136. As shown in FIG. 6, the diameter of the hollow tubes 138 is smaller than the diameter of the hollow tube 132. When the insert 126 is placed in a container 114, the hollow tube 138 will slide into the hollow tube 132. FIG. 6 is just one example of the insert 126. In another embodiment, the diameter of the hollow tube 132 is smaller than the diameter of the hollow tube 138 so that the hollow tube 132 will slide into the hollow tube 138. Alternatively, the insert 126 may be a single hollow tube having a head with an opening removably coupled to each end of the hollow tube. In any of the above embodiments, the head 128 and 134 should be sealed to the container 114 to prevent moisture from entering the container 114.

When the desired container 114 containing the insert 124 is properly aligned in a channel 110, the passage formed by the insert 124 will be in axial alignment with the openings 122A and 122B. An attachment device 139 is then placed through the opening 122A, through the passage way formed by the insert 124 and out of the opening 122B thereby securing the support member 120 to the panel 102. As shown in FIGS. 4 and 5, the attachment device 139 is a screw 140 having a nut plate 142 rotatably coupled to the screw 140. However, this is just one type of attachment device 139 and other attachment devise may be used.

When the desired container 114 containing the insert 124 is properly aligned in a channel 110, the passage formed by the insert 124 will be in axial alignment with the openings 122A and 122B. An attachment device 139 is then placed through the opening 122A, through the passage way formed by the insert 124 and out of the opening 122B thereby securing the support member 120 to the panel 102. As shown in FIGS. 4 and 5, the attachment device 139 is a screw 140 having a nut plate 142 rotatably coupled to the screw 140. However, this is just one type of attachment device 139 and other attachment devise may be used.

While embodiments of the disclosure have been described in terms of various specific embodiments, those skilled in the art will recognize that the embodiments of the disclosure can be practiced with modifications within the spirit and scope of the claims.

What is claimed is:

1. A fire protection device comprising:
    a panel having a plurality of channels formed there through;
    a plurality of sealed containers for holding a fire suppression material, wherein each one of said plurality of channels is sized to fit a single one of said plurality of sealed containers within said channel, and said one of sealed containers is removable from said one of the plurality of channels;
    a pair of openings formed through the panel and through a single channel of the plurality of channels, wherein the pair of openings are in axial alignment;
    an insert sealed to one of the plurality of sealed containers to prevent moisture from entering the sealed container, the insert having a first end attached to a first surface of the sealed container and a second end attached to a second surface of the sealed container, the insert forming a passage through the one sealed container, the passage in axial alignment with the pair of openings; and
    an attachment device for removably coupling the fire protection device to a structure to be protected.

2. A fire protection device in accordance with claim 1 further comprising an integrated backer board, the integrated backer board is one of bonded or cured to the panel.

3. A fire protection device in accordance with claim 1 wherein the insert comprises:
- a first member having a head with an opening formed therein, a hollow conduit extending down from the opening in the head, the head of the first member attached to the first surface of the one sealed container; and
- a second member having a head having an opening formed therein, a hollow conduit extending down from the opening in the head, the head of the second member attached to the second surface of the one sealed container;
- wherein the hollow conduit of the first member and the hollow conduit of the second member form the passage through the at least one container when the insert is placed in the at least one of the plurality of containers.

4. A fire protection device in accordance with claim 3 wherein the first member and the second member are sealed to the one sealed container.

5. A fire protection device in accordance with claim 3 wherein a diameter of the hollow conduit of the first member is larger than a diameter of the hollow conduit of the second member, the hollow conduit of the second member slidably coupled to the hollow conduit of the first member.

6. A fire protection device in accordance with claim 1 wherein the attachment device comprises:
- a support member having an opening formed in a first end removably coupled to the panel and a second end coupled to a support structure; and
- a connector, wherein the connector runs through the opening in the first end of the support member, the passage formed by the insert, and the pair of openings formed in at least one channel of the panel.

7. A fire protection device in accordance with claim 1 wherein the panel comprises:
- a first sheet;
- a second sheet; and
- a plurality of support beams coupled to the first panel and the second panel to form the plurality of channels.

8. A fire protection device in accordance with claim 1 wherein the panel is constructed of a composite material to handle bending and shear loads of the structure to be protected.

9. A fire protection device in accordance with claim 8 wherein the panel is constructed of one of a fiber reinforced thermoset or thermoplastic.

10. A fire protection device in accordance with claim 1 wherein the fire suppression material is aluminum oxide powder.

11. A fire protection device in accordance with claim 1 wherein the plurality of containers for holding a fire suppression material are bags filled with aluminum oxide powder.

12. A fire protection device comprising:
- a panel having a plurality of channels formed there through;
- a plurality of containers for holding a fire suppression material, wherein each one of said plurality of channels is sized to fit a single one of said plurality of sealed containers within said channel, and said one of sealed containers is removable from said one of the plurality of channels;
- a pair of openings formed through the panel and through a single channel of the plurality of channels, wherein the pair of openings are in axial alignment;
- an insert sealed to at least one of the plurality of containers, the insert having a first end attached to a first surface of the at least one container and a second end attached to a second surface of the at least one container, the insert forming a passage through the at least one container, the passage in alignment with the pair of openings in the at least one channel when the at least one container is placed in the at least channel; and
- an attachment device for removably coupling the fire protection device to a structure to be protected.

13. A fire protection device in accordance with claim 12 wherein the insert is sealed to the at least one of the plurality of containers to prevent moisture from entering the at least one of the plurality of containers.

14. A fire protection device in accordance with claim 12 wherein the insert comprises:
- a first member having a head with an opening formed therein, a hollow conduit extending down from the opening in the head, the head of the first member attached to the first surface of the at least one container; and
- a second member having a head having an opening formed therein, a hollow conduit extending down from the opening in the head, the head of the second member attached to the second surface of the at least one container;
- wherein the hollow conduit of the first member and the hollow conduit of the second member form the passage through the at least one container when the insert is placed in the at least one of the plurality of containers.

15. A fire protection device in accordance with claim 12 wherein the attachment device comprises:
- a support member having an opening formed in a first end removably coupled to the panel and a second end coupled to a support structure; and
- a connector, wherein the connector runs through the opening in the first end of the support member, the passage formed by the insert, and the pair of openings formed in at least one channel of the panel.

16. A method of forming a fire protection device comprising:
- forming a plurality of sealed containers
- forming a panel having a plurality of channels, sized to fit a single one of said plurality of sealed containers within one of said plurality of channels, there through;
- forming a pair of openings formed through the panel and through a single channel of the plurality of channels, wherein the pair of openings are in axial alignment;
- sealing an insert to said one of a plurality of sealed containers to prevent moisture from entering the one of the plurality of sealed container, the insert having a first end attached to a first surface of the one sealed container and a second end attached to a second surface of the one sealed container, the insert forming a passage through the one sealed container, the passage in axial alignment with the pair of openings;
- filling each of the plurality of containers with a fire suppression material; and
- inserting one of the plurality of containers in one of the plurality of channels.

17. The method of claim 16 wherein forming a panel comprises:
- providing a first sheet;
- providing a second sheet; and
- coupling a plurality of support beams to the first panel and the second panel to form the plurality of channels.

18. A method of claim 16 further comprising:
- providing a support member having an opening formed in a first end removably coupled to the panel and a second end coupled to a support structure; and
- providing a connector, wherein the connector runs through the opening in the first end of the support member, the passage formed by the insert, and the pair of openings formed in at least one channel of the panel.

* * * * *